March 12, 1940.  L. L. PATTERSON  2,193,255
DIRECTION SIGNAL FOR AUTOMOBILES
Original Filed May 17, 1934  2 Sheets-Sheet 1
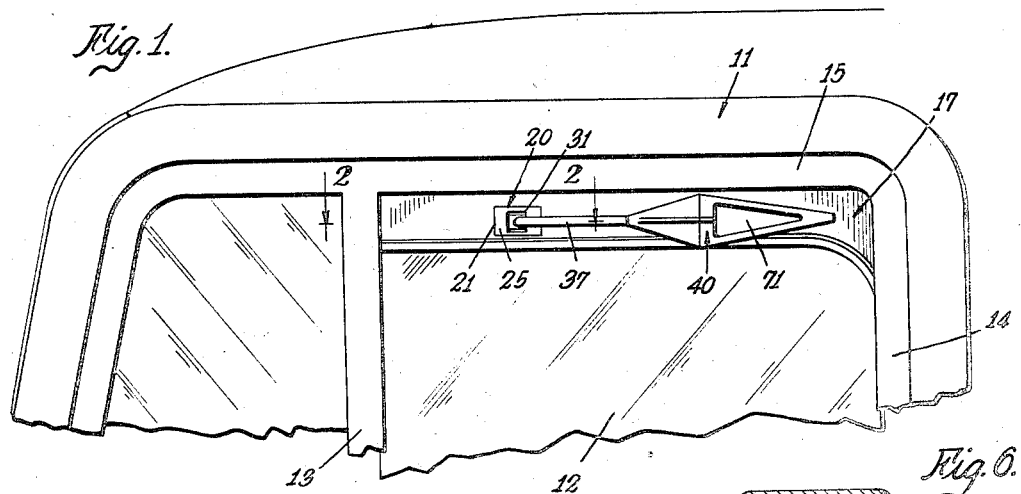
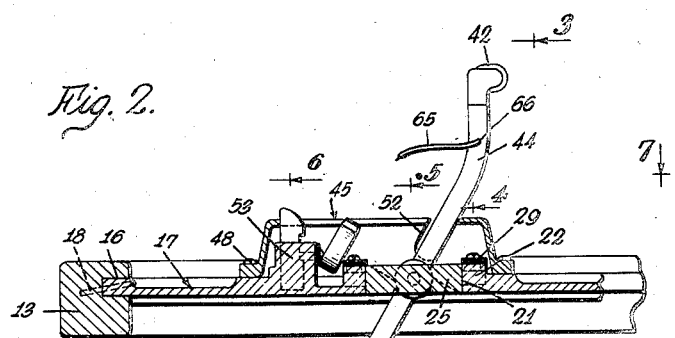
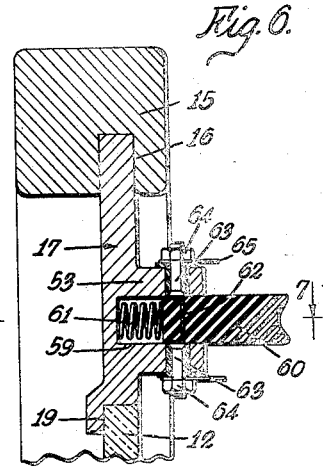
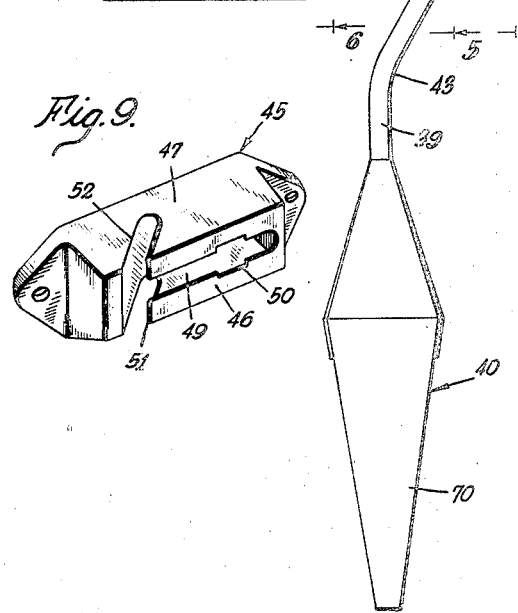
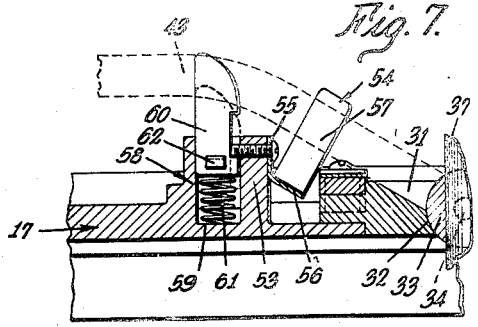
Inventor
L. L. Patterson
By Hazard and Miller
Attorneys.

March 12, 1940.   L. L. PATTERSON   2,193,255
DIRECTION SIGNAL FOR AUTOMOBILES
Original Filed May 17, 1934   2 Sheets-Sheet 2
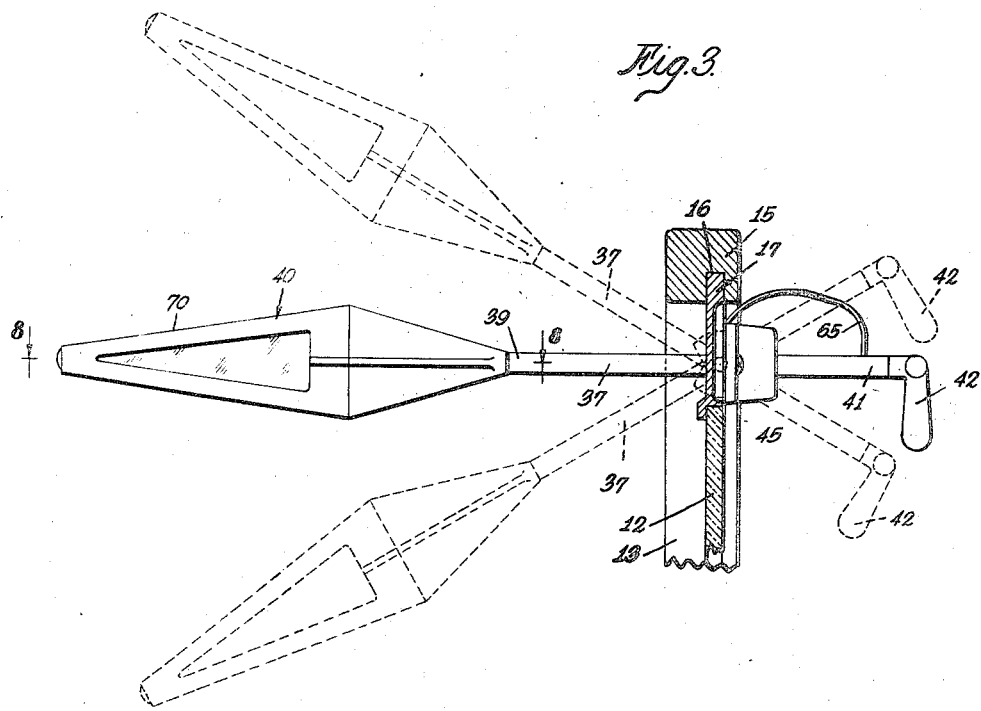
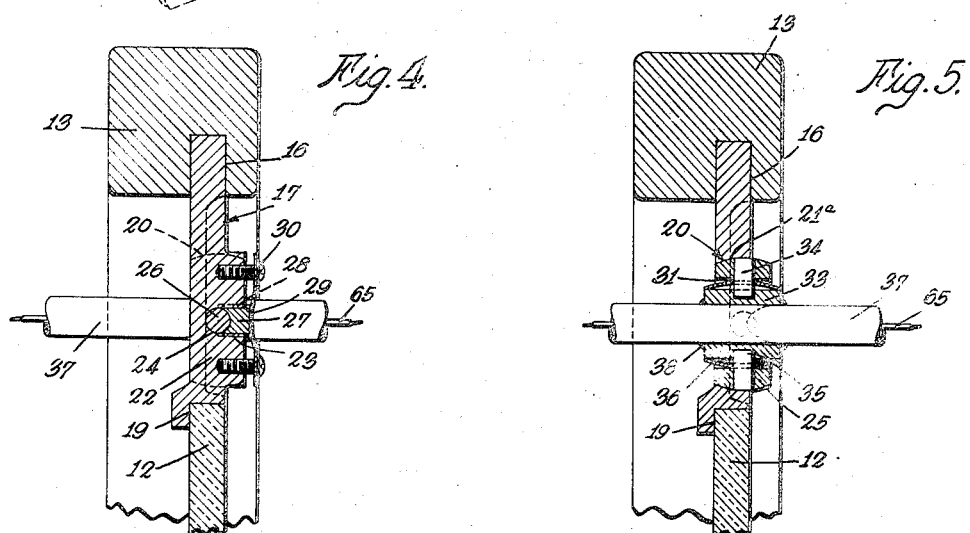
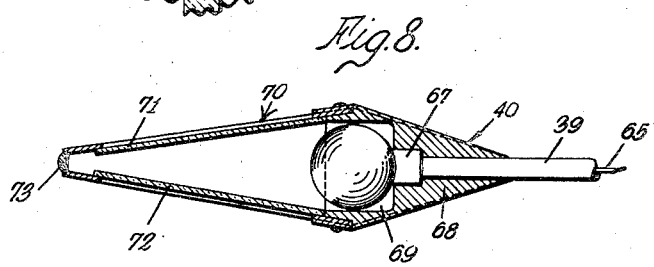
Inventor
L. L. Patterson
by Hazard and Miller
Attorneys.

Patented Mar. 12, 1940

2,193,255

UNITED STATES PATENT OFFICE 2,193,255

DIRECTION SIGNAL FOR AUTOMOBILES

Louis L. Patterson, Chula Vista, Calif.

Application May 17, 1934, Serial No. 726,076
Renewed August 21, 1939

11 Claims. (Cl. 177—329)

My invention relates to a type of automobile direction signal in which a so-called semaphore signal arm is moved into various conventional signaling positions, these being a horizontal position at right angles to the vehicle to indicate a left turn, a downward inclination in the same vertical plane and an upward inclination in the same vertical plane to indicate, respectively, a slow or stop signal and a right hand turn signal.

My signal also is of the type operated manually by one hand of the vehicle driver and in which the semaphore arm is normally in an inactive or inoperative position parallel to the side of the vehicle and extending rearwardly from its pivotal point, the arm when inoperative being in the same horizontal plane in which it gives a left hand turn signal.

In the above mentioned type of automobile signals one of the objects and features of my invention is forming the semaphore arm with an extension which extends through the side of the vehicle. This arm has bent or offset sections. On the outside I employ a signaling device with a lamp and on the inside a handle with means to grip the handle and retain the signal in an inoperative position. This handle also operates a push button type of switch, causing the lamp to be illuminated when the handle is released from the catch or clamp and moved to bring the lamp signal into a signaling position.

A further feature of my invention relates to a universal movement type of pivotal mounting for the signal arm in which I employ a first rotatable block which is mounted to rotate on the horizontal axis extending longitudinally of the side of the vehicle. This block is provided with a slot through which extends the signal arm, and this arm has a hub secured thereto and the hub is rotatably mounted on a pivot which is vertical when the arm is in the inoperative position and also when it is giving a left hand turn indication. In other words, the hub is pivoted to the block by a pivot which is transverse to the block so that the arm may be swung in a horizontal plane from its inoperative position to a position at right angles to the vehicle to give a left hand turn signal or the block with the hub may be tilted on the longitudinal axis to incline the lamp portion of the signal arm at an inclination downwardly or upwardly to give the stop or right hand turn signal.

A further feature of my invention in regard to the pivotal mounting of the semaphore arm and of the longitudinal block and transverse hub is in using a friction means including a pressure plug actuated by a spring which exerts a pressure on the longitudinal shaft or axis of the block and thus gives a stiff action holding the block in adjusted positions with the semaphore arm either horizontal or inclined upwardly or downwardly.

I also employ a friction means between the transverse hub and the longitudinal block creating a friction on the transverse pivot hubs so that the semaphore arm will be frictionally held in its retracted inoperative position independent of the clamp or when swung to a position at right angles to the side of the vehicle and in a vertical plane for giving the various signals when moved vertically in this plane.

Another object and feature of my invention is the employment of a position guide for the handle end of the semaphore arm. This has a longitudinal, horizontal slot guiding the semaphore arm in its movement from the inoperative to left turn signaling position when the arm is moved from the clamps and, in addition to this, inclined slots which are in a vertical plane and permit tilting of the semaphore arm either upwardly or downwardly.

My invention is illustrated in connection with the accompanying drawings, in which:

Fig. 1 is a side elevation of a vehicle showing the signal arm in its inoperative position.

Fig. 2 is a horizontal section on the line 2—2 of Fig. 1 but with the semaphore arm at right angles to the side of the vehicle.

Fig. 3 is a vertical transverse section on the line 3—3 of Fig. 2 in a direction of the arrows.

Fig. 4 is a detail vertical transverse section on the line 4—4 of Fig. 2 in the direction of the arrows illustrating the journalling of the longitudinal rotatable block.

Fig. 5 is a vertical transverse section on the line 5—5 of Fig. 2 in the direction of the arrows illustrating the vertical pivoting of the hub of the semaphore arm.

Fig. 6 is a vertical transverse section on the line 6—6 of Fig. 2 in the direction of the arrows through the electric switch.

Fig. 7 is a longitudinal horizontal section on the line 7—7 of Fig. 6 in the direction of the arrow illustrating the push button switch and the clamp.

Fig. 8 is a section on the line 8—8 of Fig. 3 in the direction of the arrows showing the lamp housing.

Fig. 9 is a perspective view of the guide for the semaphore arm.

Referring to the general mounting, this shows part of a vehicle 11 which has a window 12 mounted in a frame having stiles 13 and 14 and lintel 15. These are grooved or rabbeted as indicated at 16, and a metal supporting plate 17 is secured in the grooves or rabbets, being preferably attached by screws 18 to form a permanent mounting. The glass of the window engages in a horizontal groove or rabbet 19 at the lower edge of the supporting plate. (Note Figs. 4 and 5.)

The supporting plate has an opening 20. This opening has vertical edges 21 and slightly concaved edges 21a. On each side of the opening there is a thickened or journalled section 22 of the supporting plate and this has a pair of longitudinal slots 23 with a semi-circular bearing surface 24.

Mounted in the opening 20 there is a horizontally rotatable block 25. This block is provided with a pair of shaft ends 26 which may be inserted through the slots 23 to engage the journal surface 24. A friction plug 27 engages in each of the slots and has guide splines 28 to prevent its rotation. Each plug bears on the shaft end 26 by means of a flat spring 29 clamped against the plug by means of screws 30 which extend through each end of the spring and into the journal section 22 of the supporting plate. Thus a regulated degree of friction may be brought on the journals of the block 25 to restrict its free rotation and to hold the block at the desired position. In order to make a snug fit the upper and lower edges of the opening 20 are made concave and the upper and lower edges of the block 25 are made convex. The block 22 has an opening 31 therethrough, this opening being at a slope but having a partly cylindrical section 32 (note Fig. 7), the cylindrical section accommodating the hub 33 which hub has a pair of pivot pins 34 at the top and bottom. These pivot pins are fixed in the upper and lower parts of the longitudinal block 25 but the hub may rotate on the ends of these pins, there being journal sockets 35 in the hub. Springs washers 36 are used to create a friction between the hub and the block 25.

Extending through the hub is a tubular semaphore arm 37, this being welded or soldered to the hub as indicated at 38. On the outer portion 39 of the semaphore arm there is the lamp housing 40. The inner or handle end 41 is provided with a hand grip 42. It will be noted that there is an angular bend 43 on the outer portion of the semaphore arm and a reverse angular bend 44 on the handle section.

The semaphore arm is guided in its movement by a guide cover designated by the assembly numeral 5. This cover has a side wall 46 and top and bottom walls 47 and is attached to the supporting plate 17 by screws 48. The side wall 46 is provided with a longitudinal slot 49 having an enlargement 50. Connecting this there is a vertical intersecting slot 51 and in the top and bottom walls 47 there is a slot 52, this being inclined relative to the guide cover but the upper and lower slots 52 and the slot 51 are in the same vertical plane.

In order to clamp the semaphore arm in its inoperative position a boss 53 is formed on the inside of the plate 17 and attached to one side of this boss there is a clamp 54. This is provided with a tongue 55, a base strip 56 and two clamp arms 57. These arms engage the horizontal section of the semaphore arm when the arm is in its neutral or non-signalling position.

In order to give a light signal on operating the semaphore arm I provide an electric switch essembly 58. This makes use of a recess 59 in the boss 53 in which recess slides an insulating push button 60 being normally pressed upwardly by a spring 61. This button carries a bridging conducting strip 62 which engages contacts 63 on electric terminals 64, these terminals being connected to electric lead wires 65. There are two of these wires, one leading from the source of power such as a storage battery, to one of the terminals, and the other wire from the other terminal to the tubular semaphore arm, the wire being flexible and passing through an opening 66 in the horizontal section of the arm. The wire leads to the lamp socket 67 in the lamp housing 40. (Note Fig. 8.) The lamp socket is grounded forming a return circuit.

The lamp housing has a tapered base 68 with a recess 69 therein. A pyramidal shaped cover 70 is attached to the base and has front and rear glass panels 71 and 72. The one facing towards the rear may be of a red color to give a rear signal, the front may be of a yellow or other color, and at the end may be a small glass 73 of any desired color.

The manner of operation and functioning of my invention is as follows:

When the signal is in its housed inoperative or neutral position the semaphore arm and the lamp housing occupy the position shown in Fig. 1 and the horizontal end of the arm has the position shown in Fig. 7. On account of the bends 43 and 44 in the semaphore arm the axis of the lamp housing is substantially parallel to the supporting plate 17 on the outside and the end of the horizontal section adjacent the hand grip parallel to the inside of this plate but spaced sufficiently so that a person can readily grasp the hand grip. The clamp 54 holds the semaphore arm in this inoperative position and the handle section depresses the push button 60 of the electric switch and opens the circuit. The two arms 57 of the clamp extend through the enlarged portion 50 of the slot 49 and this slot also functions to retain the semaphore arm from swinging downwardly on the outside, this acting in addition to the clamp.

Presuming it is desired to give a left hand turn signal, the hand grip 42 is grasped and the semaphore arm swung in a horizontal plane. The slot 49 forming a guide, it may be moved until the inner handle end engages the remote side of the vertical slot 51, in the cover assembly 45. This then positions the semaphore arm and the lamp housing in a horizontal position at right angles to the side of the vehicle as shown in Fig. 5. If it is desired to give a stop signal, the inner or handle end of the semaphore arm is moved upwardly in the vertical slot 51 and in the slot 52. This slot is at an angle to the wall 46 due to the semaphore arm being bent in reference to the axis of the lamp housing. This inclines the lamp housing downwardly as shown by the lower dotted position of Fig. 3.

To give a right hand turn signal, the reverse motion is given, that is, the handle end is moved downwardly in the vertical slot 51 and in the lower slot 52, thus positioning the lamp housing in the upwardly inclined dotted position of Fig. 3. If it is desired to give either a stop or a right hand turn signal directly from the neutral position the semaphore arm is swung first in a horizontal plane and then in a vertical plane either upwardly or downwardly. In swinging the semaphore arm in a horizontal plane from its neutral position, the hub 33 with the semaphore arm turns on the vertical pivot pins 34 which are mounted in the oscillating block. Then when it is desired to incline the semaphore arm either upwardly or downwardly, the block 25 is rocked on its pivot shafts 26. As above mentioned, both of these pivotal motions have a frictional resistance so that when the semaphore arm is in its horizontal left turn signalling position or in its upwardly inclined right hand turn signalling position, the friction on the pivots is sufficient to hold the semaphore arm and the relatively heavy lamp housing in the desired signalling position. These friction pivots will also retain the device in the stop signalling position, but in addition, the limits provided by the slots 52 will hold the arm in such position for giving a stop or slow signal.

When the arm is moved from its neutral or housed position and becomes disengaged from the clamp 54, the push button switch is thrust outwardly by the spring 61 and this forms a bridging contact from the terminal 63 through the bridging piece 62 and thus closes the circuit to the lamp and the lamp thus gives a signal light from the moment the semaphore arm is moved from its neutral position thus attracting the attention of other drivers or pedestrians and showing the final signalling position.

Various changes may be made in the details of construction without departing from the spirit or scope of the invention as defined in the appended claims.

I claim:

1. A direction signal, comprising in combination a vehicle wall structure having an opening, a swivel in said opening, a semaphore arm secured to the swivel and having a part inside and another part outside of the wall structure, a resilient clamping means to engage and clamp the inside part of the arm when in an inoperative neutral position, an electric lamp in the arm, an electric switch in circuit with the lamp, means to urge the switch normally to closed circuit position, the switch being positioned to be engaged by the semaphore arm when in its neutral position held by the clamp with a part of the arm engaging the switch and holding the switch in open circuit position.

2. A direction signal comprising, in combination, a supporting plate, means for attaching said plate in an opening in the side of a vehicle, said plate having an opening, a unitary semaphore arm pivotally connected to said plate and extending inside and outside thereof and having a universal pivotal mounting in the plate, a guide cover having a vertical inner wall and top and bottom walls secured to the inside of the plate, said guide cover having a horizontal guide slot in the vertical wall, a vertical guide slot in said vertical wall connected to the horizontal slot, and a pair of slots in the upper and lower walls, said slots forming a guide to engage a portion of the semaphore arm when said arm is moved in a horizontal plane and in a vertical plane.

3. A direction signal comprising in combination, a supporting plate with means for attaching the same to an opening in the side of a vehicle, said plate having an opening, a unitary semaphore arm extending inside and outside the said plate and universally pivoted to the said plate at the opening, means to prevent a rotation of the arm about its longitudinal axis, a guide cover attached to the inner wall of the supporting plate and having a horizontal and a transverse guide slot, the transverse slot being in a vertical plane, the semaphore arm having an integral inner handle section operating in such guide slots and movable first in a horizontal plane from an inoperative to an operative position and then in a vertical plane in the vertical slots to give additional signalling positions to the semaphore arm.

4. A direction signal comprising in combination, a vehicle having an opening in a side wall, a semaphore arm universally pivoted in said opening, said semaphore arm having a straight section extending through the opening with an angularly bent end on the outside with a signalling device secured to said latter end, means to prevent a rotation of the arm about its longitudinal axis, a guide cover on the inside of the vehicle having a horizontal slot and a vertical transverse slot, the said slots forming a guide for the inner portion of the arm, the horizontal guide slot guiding the arm in a movement in a horizontal plane and the transverse slot guiding the movement of the arm in a vertical plane, the signalling device when the semaphore arm is located in the vertical slot being at right angles to the side of the vehicle and moving in a vertical plane to give an upwardly inclined and a horizontal and downwardly inclined signalling position in a plane at right angles to the side of the vehicle.

5. A direction signal comprising in combination, a wall structure having a universal pivotal mounting means, a unitary semaphore arm extending through said mounting, means with part inside and part outside means to retain the arm with the outside signalling portion extending rearwardly in a horizontal plane from the pivotal mounting means and substantially parallel to the wall structure, and means to engage and guide the arm first to swing in a horizontal plane and then a further means to engage and guide the arm when swinging in a vertical plane.

6. A direction signal comprising in combination, a vehicle wall structure having an opening with a universal pivoting mounting means in the opening, a unitary semaphore arm secured to part of said mounting means and having a hand grip on the inside and a signalling portion on the outside, a guide structure on the inside of the wall to position the arm when in an inoperative position with the signalling portion extending along the side of the vehicle and substantially parallel to the wall, the said guide structure engaging and guiding the arm in a first movement outwardly in a horizontal plane and having secondary guide means to engage and guide the arm when in its extreme outward horizontal position upwardly or downwardly in a vertical plane.

7. A direction signal comprising in combination a supporting plate having an opening, a semaphore arm extending through said opening, a universal joint pivotal connection between the arm and the plate, the arm having an inner handle portion and an outer portion with a lamp and electric wiring extending through the arm, an electric switch having an insulated push button with a conductor mounted in said plate, a spring tensioned to elevate the push button to a closed circuit position, means to form a circuit operated by the button to the lamp, a guide means for the inner end of the arm whereby in a movement of the semaphore arm to a neutral position, the inner portion of the arm engages the push button and depresses the button, thereby opening the circuit.

8. A direction signal for a vehicle comprising a portion of a wall structure of the vehicle having an opening, a semaphore arm having an integrally connected inner and outer portion having a pivotal connection to the wall structure at the said opening, the outer part of the arm having a signal lamp, an electric switch on the inside of the vehicle, a guide means for the inner end of the arm, a clamping means to engage the arm when moved to its neutral position in the said guide, the said clamp holding the inner end of the arm in engagement with the switch and moving the switch to an open circuit position, the switch having means to close the circuit on movement of the inner end of the arm out of engagement with the switch and a circuit through the switch to the lamp.

9. A direction signal for a vehicle comprising a portion of a wall structure of the vehicle having an opening, a semaphore arm having an integrally connected inner and outer portion with a universal joint connection to the wall structure at the said opening, the said joint having means to prevent rotation of the arm on its axis, a guide cover having a wall parallel to the said wall structure with a horizontal slot and an intersecting vertical slot, the inner end of the arm being guided in the said slots and when located at the end of the horizontal slot positioning the outer portion in a neutral position, the edge of the vertical slot opposite the horizontal slot forming a limit to the horizontal movement of the arm to a signalling position and defining the position of the arm with the outer portion extending horizontally and at right angles to the said wall, the transverse slots above and below the horizontal slot providing means for guiding an inner portion of the arm to move the outer portion of the arm in a vertical plane.

10. A direction signal as claimed in claim 7, the said guide means being in the form of a guide cover with an outer wall having guide slots, a clamp positioned mainly in said guide cover adjacent the push button whereby when the semaphore arm is moved to its neutral position the clamp engages the said arm and holds the arm with the push button in the open circuit position.

11. A direction signal as claimed in claim 9, the guide cover having upper and lower walls, each with a slot connecting with the vertical slot, the slots in the upper and lower walls being at acute angle to the portion of the front wall having the horizontal slot, the semaphore arm having an angular bend at its outer portion whereby when the inner end engages in the slots in the upper and lower walls of the guide cover, the outer portion of the arm is positioned at right angles to the said wall structure and inclined either upwardly or downwardly relative to the universal joint.

LOUIS L. PATTERSON.